United States Patent [19]
Hoye

[11] Patent Number: 5,232,370
[45] Date of Patent: Aug. 3, 1993

[54] CHILDREN'S DENTAL TEACHING TOY

[76] Inventor: Mary E. Hoye, 201 E. Chestnut St., Chicago, Ill. 60611

[21] Appl. No.: 951,451

[22] Filed: Sep. 25, 1992

[51] Int. Cl.$^5$ ............................................. G09B 23/28
[52] U.S. Cl. ................................... 434/263; 434/264; 446/296
[58] Field of Search ................ 434/263, 264; 446/296, 446/472

[56] References Cited

U.S. PATENT DOCUMENTS

| | | | |
|---|---|---|---|
| 2,095,511 | 10/1937 | Oberto | 434/264 |
| 2,780,002 | 2/1957 | Shea et al. | 434/263 |
| 3,210,887 | 10/1965 | Glass et al. | 446/339 X |
| 3,299,512 | 1/1967 | Brigante | 434/264 |
| 3,458,936 | 8/1969 | Schulz et al. | 434/263 |
| 3,886,661 | 6/1975 | Neill | 434/263 |
| 4,073,071 | 2/1978 | Angelotti | 434/264 X |
| 4,221,060 | 9/1980 | Moskowitz et al. | 434/264 |
| 4,231,181 | 11/1980 | Fabricant | 434/264 X |
| 4,242,812 | 1/1981 | Randoll et al. | 434/263 |
| 4,508,512 | 4/1985 | Girsch et al. | 434/259 |
| 4,770,637 | 9/1988 | Harrell, Jr. | 434/263 |
| 4,812,127 | 3/1989 | Hernandez | 434/264 |
| 4,902,232 | 2/1990 | Neustadter | 434/263 |
| 5,120,229 | 6/1992 | Moore et al. | 434/263 |

Primary Examiner—Gene Mancene
Assistant Examiner—L. Thomas
Attorney, Agent, or Firm—Allegretti & Witcoff, Ltd.

[57] ABSTRACT

A dental teaching toy for children having structure including an artificial upper artificial gums, artificial baby teeth, and artificial adult molars (for which there are no earlier and corresponding baby teeth). Also included is at least one removable artificial baby tooth having a crown, and an artificial adult tooth having a crown and a root, the adult tooth positioned within a channel in the artificial gum wherein the removable baby tooth is removably attached to the crown of the adult tooth. The removable baby tooth can be manually replaced by the adult tooth by placing a finger through a proximal opening in the artificial gum and pushing on the root of the adult tooth, thereby pushing the crown of the adult tooth through a distal opening in the gum, thereby pushing the baby tooth out from the gum and can be removably detached from the adult tooth. The baby tooth can be removably attached back in place on the gum by pushing the crown of the baby tooth against the crown of the adult tooth and pushing the adult tooth back into the channel within the gum.

17 Claims, 5 Drawing Sheets

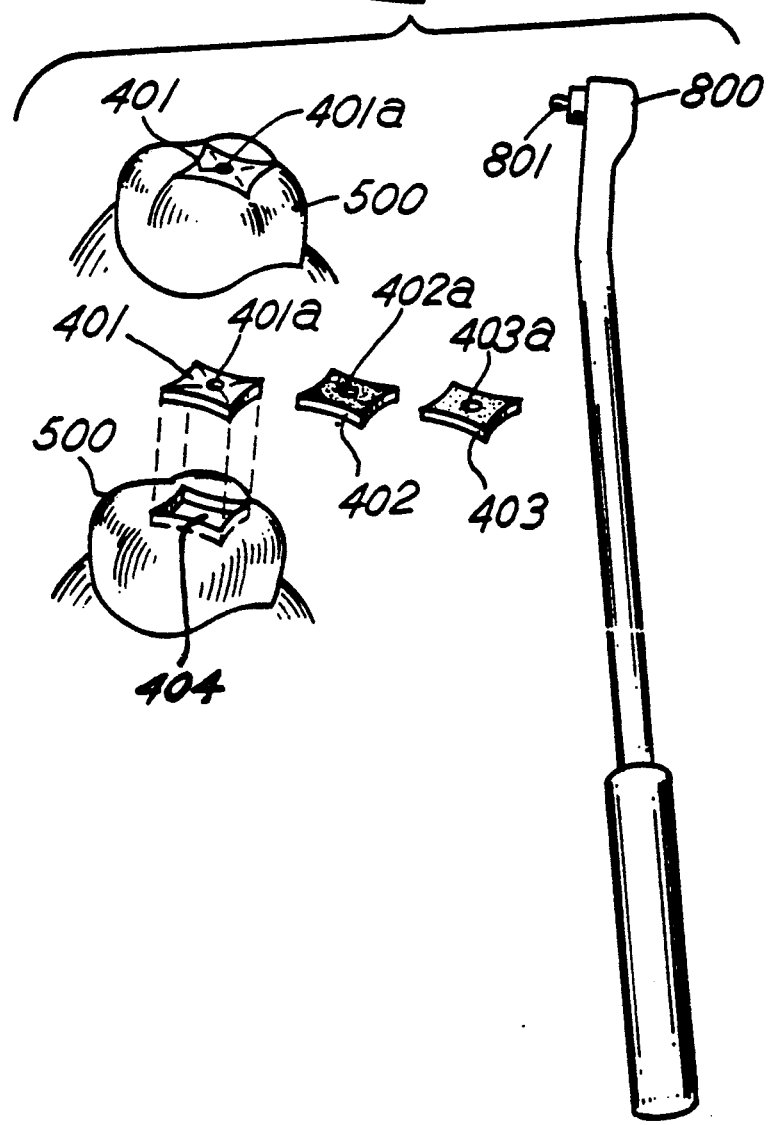

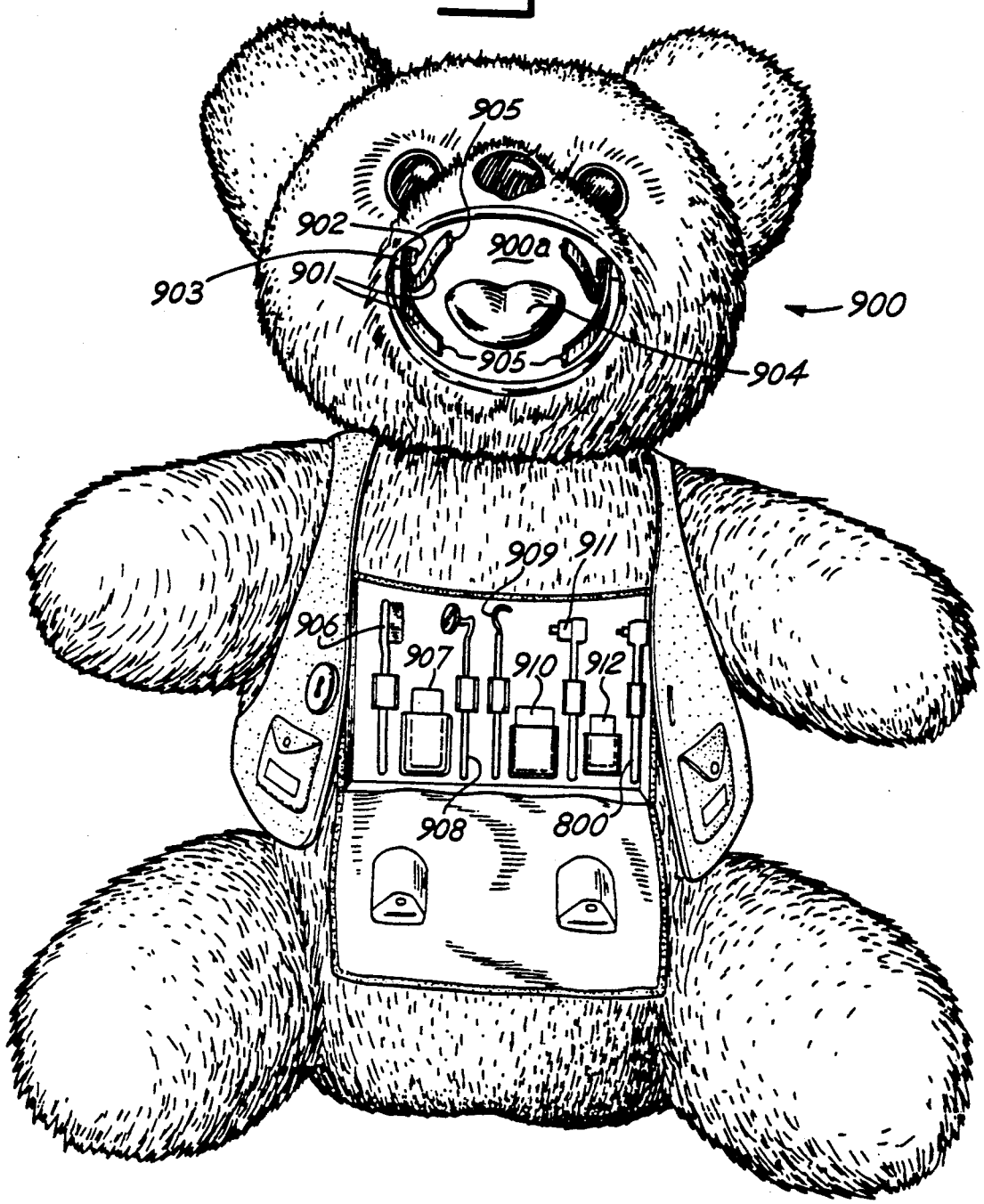

CHILDREN'S DENTAL TEACHING TOY

BACKGROUND OF THE INVENTION

This invention is a dental teaching toy for children. In particular, the present invention is a teaching toy to educate children in dental hygiene and to prepare children for their first visits to a dentist so that they will have a more clear and comfortable understanding of what to expect in a dental examination.

Earlier toys have been disclosed, however, they do not have the structural features that can enable children to learn about and observe the growth of adult teeth and replacement of baby teeth. For example, U.S. Pat. No. 4,221,060 discloses a doll's head having teeth and U.S. Pat. No. 4,231,181 discloses a toy having a simulated jaw and tooth retaining means for a single set of teeth. The present invention is designed to provide a toy that simulates the gums and teeth, both baby and adult teeth, of a child in a way that is more accurate and complete than prior toys, thereby allowing children to learn about their teeth and dental care in a more accurate and complete way.

Parents and dental professionals are frequently faced with the problems of educating young children about dental hygiene and preparing children for their first visits to a dental professional. In particular, parents have long been faced with the problem of not having a suitable toy that they can use to teach their children about dental care. These problems can give rise to and-/or increase the fears and anxieties of parents in not being able to educate and/or care for their children.

Because of these problems, many children do not have a clear and comfortable understanding of how to care for their teeth and/or may be nervous or frightened about dental examinations. These problems may also lead to parental anxiety. In addition, some children do not learn about how to properly care for their teeth, thereby leading to tooth decay and/or gum disease. This can, in turn, result in parental guilt. Moreover, some children never overcome their dental neuroses, even when they grow older and become adolescents and adults. With these problems in mind, the present invention was conceived and designed.

An objective of the present invention is to provide a dental teaching toy or model that can be used to educate children about their teeth and gums in general, as well as educate children about the replacement of primary (i.e. "baby") teeth with permanent (i.e. "adult") teeth. Using the present invention, a child will be able to observe how the top and bottom teeth mesh and line up and compare their own mouth to the model. The child can use the present invention to learn about mouth and dental structures, such as baby and adult teeth, tooth structure, tooth alignment, and proper occlusion, i.e. bite.

Another objective of the present invention is to provide a dental teaching toy that can be used to teach a child about dental hygiene. A more specific objective of the invention is to provide a child with a toy that the child can play with and practice the brushing and flossing of teeth and gums.

A further objective is to provide a dental teaching toy that can be used to teach a child about what to expect at a visit to the dentist. Still further, the toy of the present invention can be used by a child as a toy to simulate work carried out by dental professionals, thereby allowing the child to become familiar with the dental examination before the actual examination takes place.

Another objective of the present invention is to provide an educational toy for children that shows a mouth that is aesthetically pleasing to look at, easy and safe for children to play with, and relatively inexpensive to make.

The foregoing objectives, features and advantages of the present invention will be apparent from the following description when read in conjunction with the accompanying illustrative drawings.

SUMMARY OF THE INVENTION

In accordance with the present invention, there is provided a dental teaching toy for children that comprises artificial upper and lower gums, baby teeth, and adult teeth, all of which are made of a suitable material, e.g. molded plastic. The invention can also provide an artificial upper and lower jaw and means for simulating jaw movement. Means for simulating jaw movement can be a hinge-like structure where the back section of artificial upper and lower jaws meet at an angle and are connected by a frictional fastener that allows the jaws to move relative to one another.

There is also provided at least one artificial baby tooth, having a crown removably connected to an artificial adult tooth or an artificial gum, the artificial adult tooth having a crown and a root located within a channel in the gum. The artificial gum has a proximal and a distal opening to facilitate the replacement of the baby tooth with the adult tooth. Thus, the present invention provides a structure for demonstrating the replacement of a baby tooth with an adult tooth.

More specifically, a child's finger and/or artificial projection can be placed through a proximal opening in the artificial gum to push on the root of the adult tooth, and the crown of the adult tooth is thus pushed against the crown of the baby tooth. The crown of the adult tooth is pushed through a distal opening in the gum and the end result is that the baby tooth can be removably detached from the adult tooth or gum and is replaced by the adult tooth. The baby tooth can easily be placed back into place by pushing the crown of the baby tooth against the crown of the adult tooth and pushing the adult tooth back in the channel with the gum.

DESCRIPTION OF THE DRAWINGS

FIG. 4 is a side view showing the preferred means to add or remove a simulated portion of a crown, or a simulated cavity, or a simulated filling.

FIG. 5 is a front view of an embodiment of artificial jaws in a stuffed toy and accessories that can be used with the invention.

DETAILED DESCRIPTION OF THE DRAWINGS

Figure 1:
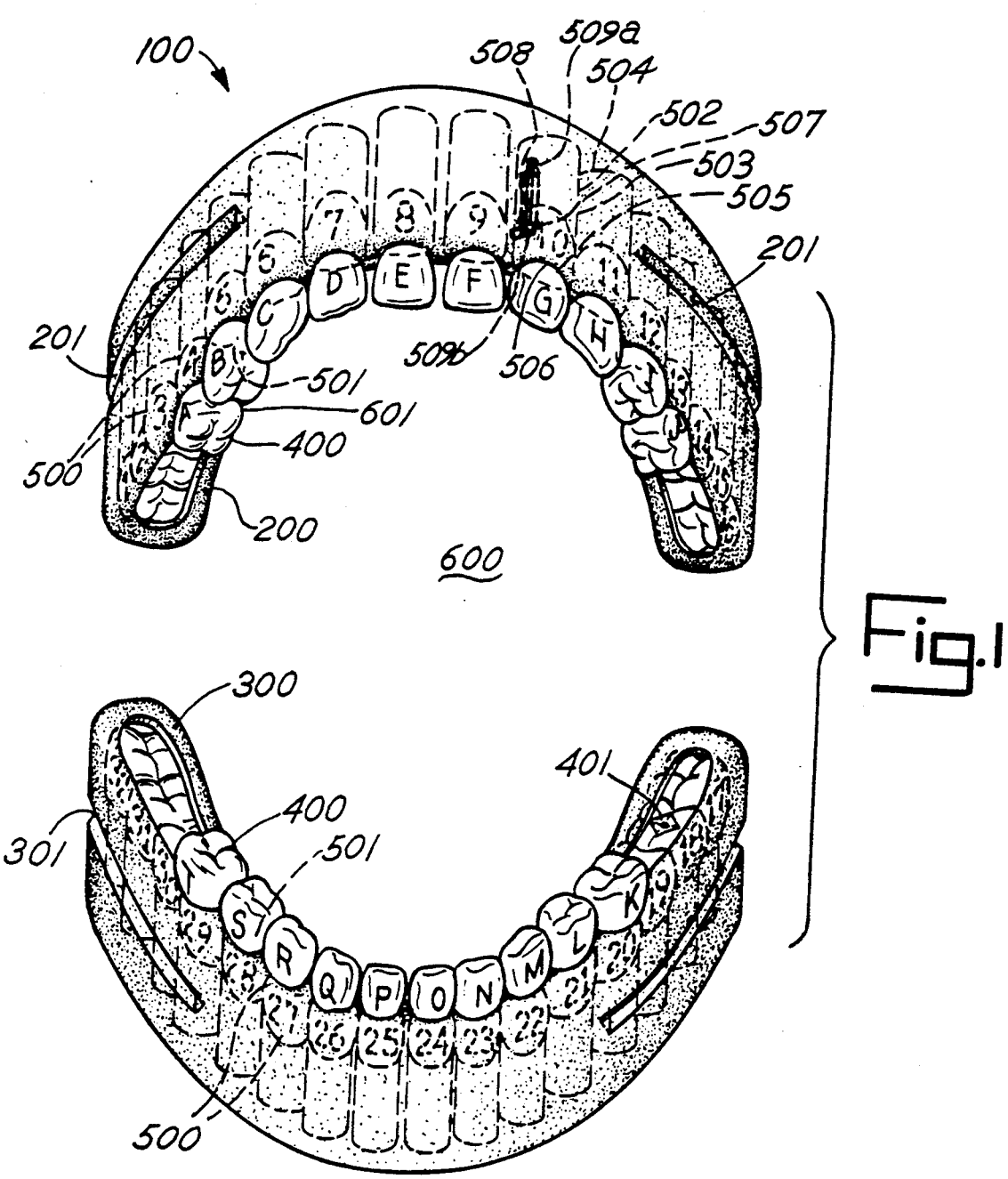
FIG. 1 is a front cut-away view of the preferred embodiment of the artificial gums and teeth of the present invention.

In FIG. 1, the preferred embodiment of the dental teaching toy 100 is shown. The teaching toy 100 includes an artificial upper gum 200 and an artificial lower gum 300. The artificial gums have artificial primary (i.e.

"baby") teeth 400, and permanent (i.e. "adult") teeth 500. The gums 200 and 300 (i.e. "gingiva") and baby teeth 400 and adult teeth 500 can be made of any suitable material, e.g. molded plastic. Gums 200 and 300 may be colored pale pink to simulate healthy gums. In addition, the gums may be transparent in selected locations to allow a child to observe how adult teeth grow into place in a human mouth. The baby teeth 400 and adult teeth 500 may be colored as desired. In the preferred embodiment, the baby teeth 400 are connected to the crown 501 of the corresponding adult teeth 500 that eventually replace them in a real human.

In the preferred embodiment, the teeth can be identified on the inside surface 601 (i.e. the "palatal or lingual" surface) of the teeth facing the inside of the mouth 600 using letters for the baby teeth 400 and numbers for the adult teeth 500 using the traditional identification used by dental professionals. Since FIG. 1 is a front view, the identifying numbers and letters are shown on the surface of the teeth 602 that faces opposite to the inside of the mouth. However, as noted above, in the preferred embodiment the identification of teeth can be shown on the surface of the teeth 601 facing the inside of the mouth 600. Thus, the baby teeth 400 can be identified by letters A through T, and the adult teeth 500 can be identified using numbers 1 through 32. As in a real human, the preferred embodiment has no corresponding baby teeth 400 for the adult teeth 500 that are molars, commonly referred to as wisdom teeth (identified as 1, 2, 3, 14, 15, 16, 17, 18, 19, 30, 31 and 32) for which there are no corresponding baby teeth 400.

Figure 3:
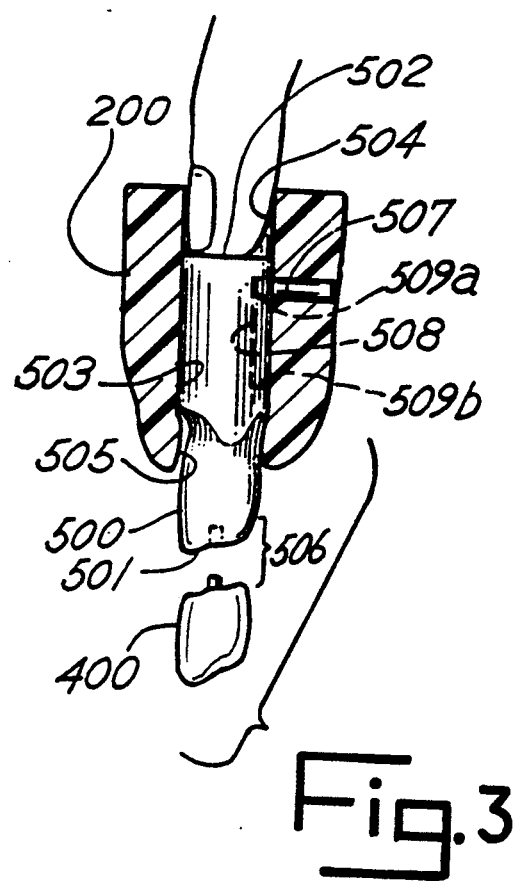
FIG. 3 is a side view showing an artificial baby tooth being removed and replaced by an artificial adult tooth in the preferred embodiment of the present invention.

In the preferred embodiment the baby teeth 400 are removably attached to the crown 501 of the corresponding adult teeth 500. Alternatively, the baby teeth 400 can be removably attached to the corresponding gum. The adult teeth also have roots 502. Each adult tooth 500 is positioned within a channel 503 in gum 200. The preferred embodiment also has proximal openings 504 in the gums 200 and 300 that are adjacent to the root 502 of each adult tooth 500. The preferred embodiment also has distal openings 505 in the gums 200 and 300 near the place of connection 506 between the adult teeth 500 and the corresponding baby teeth 400. Alternatively, connection 506 can be between baby teeth 400 and the corresponding gum 200 or 300. Connection 506 can be any equivalent connection, e.g. a snap connection, a friction connection or a male/female connection as shown in FIG. 3. Those of skill in the art will recognize the various connections that will be equivalent.

For the preferred embodiment, each baby tooth 400 can be replaced by the corresponding adult tooth 500 by placing a child's finger or a projection through the proximal opening 504 and pushing root 502 towards the distal opening 505, thereby pushing the crown 501 of adult tooth 500 fully through the distal opening 505. The baby tooth 400 can be manually removed from adult tooth 500 (or alternatively the corresponding gum), thereby leaving adult tooth 500 in the correct position.

For the adult teeth for which are no corresponding baby teeth, the crown of these adult teeth can simply by pushed through the distal opening 505 until the adult teeth are in the correct position.

Figure 2:
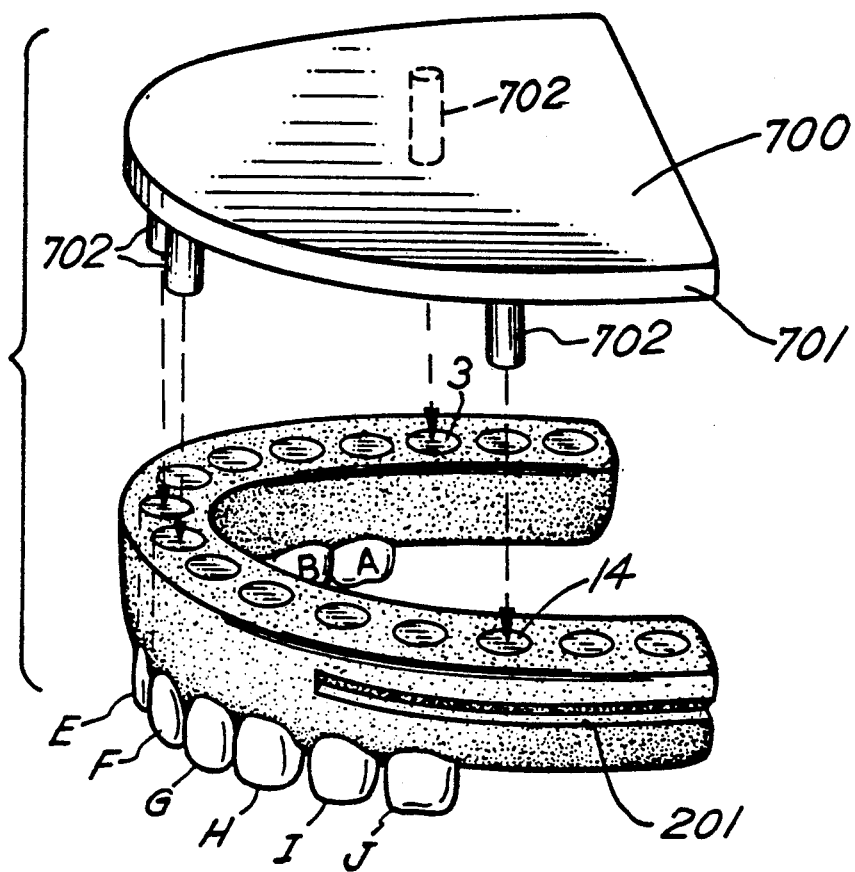
FIG. 2 is a side view of a preferred embodiment of one projection plate of the present invention.

As shown in FIG. 2, there is a projection plate 700 comprising a plate portion 701 and projections 702 that extend substantially perpendicular from the top surface of plate portion 701. In the preferred embodiment, projections 702 are positioned in a manner that when used in conjunction with the teaching toy 100, will allow the user to simulate the growth of adult teeth 500 and the replacement of baby teeth 400 with adult teeth 500 in stages for various ages.

The projection plate 700 shown in FIG. 2 provides projections 702 that can be used with the upper gum 300 of toy 100 to simulate the growth the first adult teeth 500 typically for children of the ages six to seven years old. Projection plate 700 also has projections 702 that can be used with the upper gum 300 of toy 100 to simulate the replacement of the central incisors, i.e. two center front teeth 400, typically found in children of the ages seven to eight years old.

Other projection plates are contemplated. Further, combinations of plates are also contemplated. Preferably, the age range associated for each plate is placed on the plate itself. An example of projection plates that can be used are as follows:

TABLE 1

| Upper Plate # | Child's Age (yrs) | Baby Teeth Replaced | Adult Teeth Growth |
|---|---|---|---|
| 1 | 6 to 7 | Not Applicable | 3 and 14 |
| 2 | 7 to 8 | E and F | 8 and 9 |
| 3 | 8 to 9 | D and G | 7 and 10 |
| 4 | 10 to 11 | B and I | 5 and 12 |
| 5 | 10 to 12 | A and J | 4 and 13 |
| 6 | 11 to 12 | C and H | 6 and 11 |
| 7 | 12 to 13 | Not Applicable | 2 and 15 |
| 8 | 17 to 21 | Not Applicable | 1 and 16 |

TABLE 2

| Lower Plate # | Child's Age (yrs) | Baby Teeth Replaced | Adult Teeth Growth |
|---|---|---|---|
| 1 | 6 to 7 | O and P | 24, 25, 19 and 30 |
| 2 | 7 to 8 | N and Q | 23 and 26 |
| 3 | 9 to 10 | M and R | 22 and 27 |
| 4 | 10 to 12 | L and S | 21 and 28 |
| 5 | 11 to 12 | K and T | 20 and 29 |
| 6 | 11 to 13 | Not Applicable | 18 and 31 |
| 7 | 17 to 21 | Not Applicable | 17 and 32 |

Although only two different set of projections 702 are shown in FIG. 2, i.e. projections that can be used to simulate growth of the first adult teeth to grow into place, i.e. first adult molars, and replacement of the first baby teeth typically replaced by adult teeth, many other projection plates 700 are contemplated and will be recognized by those of skill in the art.

As shown in FIG. 3, a baby tooth 400 can be replaced by the corresponding adult tooth 500 by placing a projection 702 (or alternatively, a child's finger) through proximal opening 504 in the artificial gum 200 or 300 and pushing on the root 502 of the adult tooth 500, thereby pushing the crown 501 of adult tooth 500 through a distal opening 505 in the gum 200 or 300 and against the crown 401 of the baby tooth 400. The end result is that the baby tooth 400 is pushed out and away from the gum 200 or 300, the baby tooth 400 can be removed from the crown 501 of adult tooth 500, and the adult tooth 500 is left in the position it would be in if it was a real tooth in its permanent and fully grown position.

Preferably, the artificial gums 200 and 300 can be made of transparent material at a selected location or locations so a child can observe the replacement of a baby tooth 400 with an adult tooth 500.

As further shown in FIGS. 1 and 3, adult tooth 500 moves through channel 503 as it moves into place to replace baby tooth 400. Adult tooth 500 has a sleeve 508 that has nub openings 509a and 509b at the ends of sleeve 508. Gum 200 or 300 has a nub 507 that fits into nub openings 509a and 509b. The adult tooth 500 can be pushed through distal opening 505 in either direction. When adult tooth 500 is in its simulated, permanent and fully grown position, nub 507 can be snapped into nub opening 509b. This can be accomplished by pushing adult tooth 500 against baby tooth 400 in a manner that will allow nub 507 to be snapped into nub opening 509b. When the adult 500 is pushed back into its original position within channel 503, nub 507 can be snapped into nub opening 509a. Although the foregoing is the preferred embodiment, equivalent embodiments are contemplated and will be recognized by those of skill in the art.

It is contemplated that at least one baby tooth may be removed from the gums 200 or 300. However, any number of baby teeth can be removable in the present invention.

As shown in FIG. 4, the present invention may also include simulated pieces, such as a simulate crown portion 401, a simulated cavity 402, and a simulated filling 403. In the preferred embodiment of the invention, the simulated pieces may fit into hole 404 in the crown of baby teeth 400 or adult teeth 500. Means can be used to add or remove simulated crown portion 401, simulated cavity 402, and simulated filling 403. In the preferred embodiment of the present invention, simulated crown portion 401 can be shaped like a four pointed star having a hole 401a in the center. A simulated drill 800 can have a male plug 801 that fits within hole 401a so that simulated crown portion 401 can be removed or added from one or more baby teeth 400 or adult teeth 500. Simulate cavity 402 and simulated filling 403 can also be shaped like a four pointed star having holes 402a and 403a, respectively, and can be removed or added to baby teeth 400 or adult teeth 500 in the same manner.

As shown in FIG. 5, a animal or human-like toy 900 can be used. Stuffed toy 900 can be any suitable imaginary character. For example, as shown in FIG. 5, the animal or human-like toy 900 can be a teddy bear. Animal or human-like toy 900 can have a mouth 900a and upper and lower jaws 901 and means for simulating jaw movement. Means for simulating jaw movement can be any equivalent means, and may include a hinge-like structure. As shown in FIG. 5, in the preferred embodiment of the invention, hinge 902 is provided. Hinge 902 is a structure where the back sections of upper and lower jaws 901 meet at an angle and are connected by a frictional fastener 903 that allows the jaws to move relative to one another. In the preferred embodiment, gums 200 and 300 can be removably connected to jaws 901 by inserting ridges 201 and 301 into rails 905. Animal or human-like toy 900 can also have a tongue 904 in mouth 900a, preferably in the anatomically correct position.

As shown in FIG. 5, various accessories can be used with the device to demonstrate proper dental hygiene and/or dental tools used by a dentist in an examination of a patient. Shown for example, is toothbrush 906, dental floss 907, dental mirror 908, dental pick tool 909, x-ray film 910, dental polisher 911, gauze 912, and dental drill 800. Dental polisher 909 and dental drill 800 can be combined into one dental polisher/drill device so that one end is a polisher and another end is a drill.

The foregoing description of the invention has been made in general terms and with respect to several preferred embodiments. Many of the preferred embodiments stated herein may be varied by persons skilled in the art without departing from the spirit and scope of this invention. Accordingly, the invention resides solely in the claims hereinafter appended.

What is claimed:

1. A dental teaching toy for children having an artificial upper gum and an artificial lower gum, the artificial gums having artificial baby teeth and artificial adult teeth, wherein there is at least one artificial baby tooth connected to the toy in its natural position relative to the corresponding gum, means for removing the artificial baby tooth from the toy, a corresponding artificial adult tooth located within a channel in the gum, the artificial gum also having a proximal opening that is located adjacent to the bottom of the root of the artificial adult tooth, and a distal opening in the gum that is located near the connection between the baby tooth and the toy, the proximal opening being large enough to accept a projection that can push the crown of the adult tooth through the distal opening, whereby the artificial baby tooth can be manually interchanged with the artificial adult tooth and thus demonstrate the replacement of baby teeth by adult teeth.

2. The dental teaching toy for children of claim 1, including at least one projection plate comprising a plate portion and projections that are substantially perpendicular to the plate portion to push adult teeth into a position in relation to the gums to simulate the typical growth of adult teeth in stages at certain human ages.

3. The dental teaching toy for children of claim 1, where at least one tooth has a removable artificial crown portion, and means for removing or adding the removable crown portion.

4. The dental teaching toy for children of claim 3, wherein the means for removing of adding the removable crown portion includes an artificial dental tool adapted to remove or add the crown portion from the artificial tooth as desired.

5. The dental teaching toy for children of claim 1, where the device also includes at least one artificial dental tool whereby the device can be used to simulate dental work performed by a dentist.

6. The dental teaching toy for children of claim 1, where at least one gum is made of transparent material so an observer can see the adult tooth as it moves from its position in the channel to its position on the gum.

7. The dental teaching toy for children of claim 1, wherein the gums have ridges that fit into rails of jaws of an animal toy or human-like toy.

8. The dental teaching toy for children of claim 7, where the animal toy or human-like toy also includes a tongue in the mouth of the animal toy or human-like toy.

9. The dental teaching toy for children of claim 8, wherein the jaws of the animal toy or human-like toy have means for simulating jaw movement.

10. The dental teaching toy for children of claim 1, wherein the gum that corresponds to the baby tooth has a nub and the adult tooth that corresponds to the baby tooth has a sleeve with a first end and a second end, whereby the adult tooth can be moved relative to the gum and the nub can be moved between the first end of the sleeve in the adult tooth to the second end of the sleeve in the adult tooth to hold the adult tooth in a desired position.

11. The dental teaching toy for children of claim 1, where at least one tooth has a artificial tooth cavity, and means for removing or adding the tooth cavity.

12. The dental teaching toy for children of claim 11, wherein the means for removing of adding the tooth cavity includes an artificial dental tool adapted to remove or add the tooth cavity from the artificial tooth as desired.

13. The dental teaching toy for children of claim 1, where at least one tooth has a artificial tooth filling, and means for removing or adding the tooth filling.

14. The dental teaching toy for children of claim 13, wherein the means for removing of adding the tooth filling includes an artificial dental tool adapted to remove or add the tooth filling from the artificial tooth as desired.

15. The dental teaching toy for children of claim 1, wherein all the baby teeth and adult teeth are included to simulate the typical replacement of baby teeth by adult teeth and the growth of adult teeth in a human.

16. The dental teaching toy for children of claim 15, wherein the baby teeth are identified by letters A through T, beginning with A at one side of the upper gum and continuing to T at the same side of the lower gum, and the adult teeth are identified using numbers 1 through 32, beginning with 1 at one side of the upper gum and continuing to 32 at the same side of the lower gum, the toy further including upper and lower projection plates each comprising a plate portion and projections that are substantially perpendicular to the plate portion to push adult teeth into a position in relation to the gums to simulate the typical growth of adult teeth in the following stages at certain human ages:

| Upper Plate # | Child's Age (yrs) | Baby Teeth Replaced | Adult Teeth Growth |
|---|---|---|---|
| 1 | 6 to 7 | Not Applicable | 3 and 14 |
| 2 | 7 to 8 | E and F | 8 and 9 |
| 3 | 8 to 9 | D and G | 7 and 10 |
| 4 | 10 to 11 | B and I | 5 and 12 |
| 5 | 10 to 12 | A and J | 4 and 13 |
| 6 | 11 to 12 | C and H | 6 and 11 |
| 7 | 12 to 13 | Not Applicable | 2 and 15 |
| 8 | 17 to 21 | Not Applicable | 1 and 16 |

| Lower Plate # | Child's Age (yrs) | Baby Teeth Replaced | Adult Teeth Growth |
|---|---|---|---|
| 1 | 6 to 7 | O and P | 24, 25, 19 and 30 |
| 2 | 7 to 8 | N and Q | 23 and 26 |
| 3 | 9 to 10 | M and R | 22 and 27 |
| 4 | 10 to 12 | L and S | 21 and 28 |
| 5 | 11 to 12 | K and T | 20 and 29 |
| 6 | 11 to 13 | Not Applicable | 18 and 31 |
| 7 | 17 to 21 | Not Applicable | 17 And 32 |

17. The dental teaching toy for children of claim 1, wherein the artificial gums have proximal openings that are located adjacent to the bottom of the root of each artificial adult tooth, and distal openings in the gum that are located near the typical position the adult teeth typically grow through in a human, the proximal openings being large enough to accept a projection that can push the crown of the adult teeth through the distal opening, whereby the adult teeth can be placed into a position to demonstrate the growth of adult teeth.

* * * * *